United States Patent
Burnight et al.

(10) Patent No.: US 12,261,737 B2
(45) Date of Patent: Mar. 25, 2025

(54) NETWORK FORMATION IN WIRELESS SYSTEMS

(71) Applicant: TEXAS INSTRUMENTS INCORPORATED, Dallas, TX (US)

(72) Inventors: Alexis Justine Burnight, Dallas, TX (US); Ariton E. Xhafa, Plano, TX (US); Minghua Fu, Plano, TX (US); Vishal Coelho, Flower Mound, TX (US); Caleb Jackson Overbay, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 486 days.

(21) Appl. No.: 17/563,993

(22) Filed: Dec. 28, 2021

(65) Prior Publication Data

US 2023/0208707 A1    Jun. 29, 2023

(51) Int. Cl.
*H04L 41/0803* (2022.01)
*H04W 8/00* (2009.01)
*H04W 84/18* (2009.01)

(52) U.S. Cl.
CPC ......... *H04L 41/0803* (2013.01); *H04W 8/005* (2013.01); *H04W 84/18* (2013.01)

(58) Field of Classification Search
CPC .... H04L 41/0803; H04L 41/12; H04W 8/005; H04W 84/18; Y02D 30/70
See application file for complete search history.

(56) References Cited

U.S. PATENT DOCUMENTS

| | | | |
|---|---|---|---|
| 8,891,497 B1 * | 11/2014 | Vleugels | H04W 52/0274 370/464 |
| 2010/0329232 A1 * | 12/2010 | Tubb | E05B 39/00 370/345 |

(Continued)

FOREIGN PATENT DOCUMENTS

| WO | WO-2020030172 A1 * | 2/2020 | ............ H04W 4/70 |

OTHER PUBLICATIONS

International Organization for Standardization, "Road Vehicles—Functional Safety," Part 1, 2011, 42 p.

(Continued)

*Primary Examiner* — Shailendra Kumar
(74) *Attorney, Agent, or Firm* — Carl G. Peterson; Frank D. Cimino

(57) ABSTRACT

A method includes determining by a primary node a network formation process to establish a network with a secondary node according to a network condition of the primary node and the secondary node, the secondary node previously paired to the primary node in a previously established network connection between the primary node and the secondary node, performing by the primary node a scanning phase as part of the network formation process with the secondary node according to network configuration information stored by the primary node and the secondary node and obtained by the primary node and the secondary node in the previously established network connection; and skipping by the primary node a pairing phase of the network formation process with the secondary node responsive to the secondary node being previously paired to the primary node in the previously established network connection.

20 Claims, 6 Drawing Sheets

(56) References Cited

U.S. PATENT DOCUMENTS

| | | | |
|---|---|---|---|
| 2017/0339095 A1* | 11/2017 | Lei | H04L 61/5076 |
| 2021/0273714 A1* | 9/2021 | Lee | H04W 56/001 |
| 2021/0392427 A1* | 12/2021 | Penke | H04M 1/6066 |
| 2022/0201453 A1* | 6/2022 | Liu | H04W 84/20 |

OTHER PUBLICATIONS

International Organization for Standardization, "Road Vehicles—Functional Safety," Part 10, 2011, 90 p.

International Organization for Standardization, "Road Vehicles—Functional Safety," Part 11, 2011, 188 p.

International Organization for Standardization, "Road Vehicles—Functional Safety," Part 12, 2011, 52 p.

International Organization for Standardization, "Road Vehicles—Functional Safety," Part 2, 2011, 54 p.

International Organization for Standardization, "Road Vehicles—Functional Safety," Part 3, 2011, 38 p.

International Organization for Standardization, "Road Vehicles—Functional Safety," Part 4, 2011, 44 p.

International Organization for Standardization, "Road Vehicles—Functional Safety," Part 5, 2011, 100 p.

International Organization for Standardization, "Road Vehicles—Functional Safety," Part 6, 2011, 66 p.

International Organization for Standardization, "Road Vehicles—Functional Safety," Part 7, 2011, 24 p.

International Organization for Standardization, "Road Vehicles—Functional Safety," Part 8, 2011, 72 p.

International Organization for Standardization, "Road Vehicles—Functional Safety," Part 9, 2011, 38 p.

Texas Instruments, "Medium Access Control (MAC) For Wireless Battery Management Systems (WBMS)," May 2019, 18 p.

\* cited by examiner

NETWORK FORMATION IN WIRELESS SYSTEMS

CROSS-REFERENCE TO RELATED APPLICATIONS

The present application relates to U.S. Provisional Patent Application No. 62/861,783, which was filed Jun. 14, 2019, is titled "Fast Network Formation In Wireless Battery Management Systems," and is hereby incorporated herein by reference in its entirety.

BACKGROUND

In a wireless network system, a primary node can communicate via a wireless communications protocol with secondary nodes to control and monitor their communications. For example, a wireless battery management network system (WBMS) is a wireless network system in automotive systems. The WBMS may be a component of an electric vehicle, e.g., an electric car charged by one or more packs of battery cells. The WBMS networking protocol specifies the process to enable and monitor the battery packs. The WBMS includes an electronic control unit and one or more battery modules configured to communicate via a wireless connection with the electronic control unit. In the WBMS architecture, the electronic control unit serves as the primary node and the battery modules serve as the secondary nodes.

SUMMARY

In accordance with at least one example of the disclosure, a method includes determining by a primary node a network formation process to establish a network with a secondary node according to a network condition of the primary node and the secondary node, the secondary node previously paired to the primary node in a previously established network connection between the primary node and the secondary node, performing by the primary node a scanning phase as part of the network formation process with the secondary node according to network configuration information stored by the primary node and the secondary node and obtained by the primary node and the secondary node in the previously established network connection; and skipping by the primary node a pairing phase of the network formation process with the secondary node responsive to the secondary node being previously paired to the primary node in the previously established network connection.

In accordance with another example of the disclosure, a method includes initiating by a primary node a scanning phase of a network formation process with secondary nodes according to network configuration information, the network configuration information stored in nonvolatile memories by the primary node and the secondary nodes and obtained by the primary node and the secondary nodes is of a previously established network connection between the primary node and the secondary nodes, skipping by the primary node a pairing phase of the network formation process with the secondary nodes responsive to the primary node and the secondary nodes having the previously established network connection, and initiating by the primary node and without performing the pairing phase for the secondary nodes a data exchange phase of the network formation process with the secondary nodes.

In accordance with another example of the disclosure, an apparatus includes secondary nodes comprising first non-transitory and nonvolatile memories configured to save network configuration information, and a primary node comprising a second non-transitory and nonvolatile memory configured to save the network configuration information, the primary node configured to perform a scanning phase as part of a network formation process with the secondary nodes to establish a network according to the network configuration information, the network configuration information obtained by the primary node and the secondary nodes in a previously established network connection between the primary node and the secondary nodes, and skip a pairing phase of the network formation process with the secondary nodes responsive to the primary node and the secondary nodes having the previously established network connection.

DETAILED DESCRIPTION

In wireless network systems, the network may be initially established in a network formation process. During this process, a primary node and one or more secondary nodes may perform steps to join the network before beginning to exchange data. The time needed for network formation, also referred to herein as the network formation time, introduces startup latency to the wireless network system. The network latency can affect the response time for applications and systems that may be time sensitive and have stringent startup time requirements. For example, responsive to the network being started in a WBMS of an electric vehicle, secondary nodes for monitoring the battery packs may connect, during the network formation process, to a primary node to set up the network configuration before data transmission can begin. The data transmission for battery monitoring is then started to ensure that the monitored battery packs are active and the electric vehicle is safe to begin driving. This network formation process introduces startup latency which could delay the detection of any safety concerns and may affect user experience.

This description describes various examples for reducing the startup latency in wireless network systems, such as the WBMS. The startup latency is reduced by performing the network formation process with reduced network formation time. The network formation time may be reduced by first choosing a network formation type to implement according to the current network condition, and then performing steps, according to the network formation type, to restart the network with a shorter startup time in comparison to a full network formation process. The startup time may be shortened by skipping the pairing of existing secondary nodes with the primary node during a pairing phase of the network formation process. The pairing phase may also be entirely skipped if there are no new secondary nodes added to the network. The existing secondary nodes may be identified according to unique identifiers (IDs) assigned to the secondary nodes responsive to the network being previously established. The unique IDs assigned to the secondary node may be saved in a nonvolatile memory of the primary and secondary nodes. The startup time may also be shortened by skipping the exchange of new network configuration information including assigning new transmission slots between the primary and secondary nodes. Instead, the primary and secondary nodes may communicate during the network formation process according to saved network configurations including previously assigned transmission slots from the time the network was last established.

Figure 1:
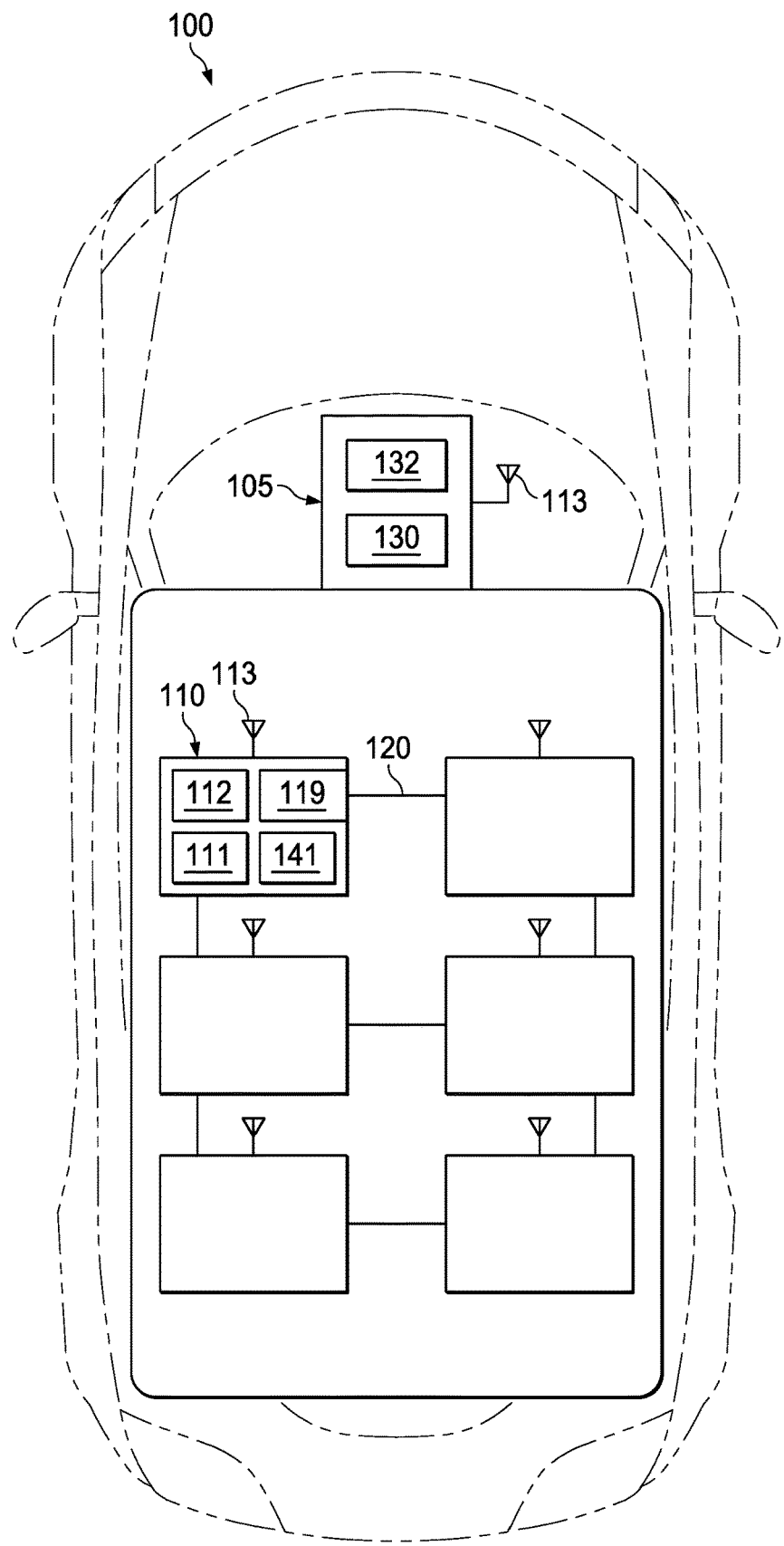
FIG. 1 is a block diagram of an automotive vehicle including a wireless battery management system (WBMS), in accordance with various examples.

FIG. 1 is a block diagram of an automotive vehicle including a wireless battery management system (WBMS), in accordance with various examples. FIG. 1 shows an automotive vehicle 100 including a primary node 105 and one or more secondary nodes 110. In at least some examples, the primary node is an electronic control unit (ECU). In at least some examples, the secondary nodes are, or include, battery modules. The primary node 105 and the secondary nodes 110 may together form the WBMS, in which the primary node 105 manages communication of the secondary nodes 110. The automotive vehicle 100 may also be referred to as an electric vehicle (EV) or any other automotive vehicle that includes an electric engine powered by battery cells, or that includes other electric systems powered by battery cells. The secondary nodes 110 may each include a controller 111 for processing communications data, a wireless communications interface 112 and an antenna 113 capable of exchanging wireless communications signals with the primary node 105. Similarly, the primary node 105 may include a wireless interface 130 and an antenna 131.

The primary node 105 may include an embedded electronic system or circuitry 132 that controls one or more of the electric systems or subsystems in the automotive vehicle 100, such as power, air conditioning, heating, radio, and electromechanical systems. The secondary nodes 110 include one or more battery units 119 coupled to each other by way of a controller area network (CAN) bus 120 or other networking and/or bus structure. The battery unit may include a battery pack including stacked battery cells. A battery cell is an electrochemical cell capable of generating electrical energy from chemical reactions. For example, the electrochemical cells may be voltaic cells or galvanic cells that generate an electric current. The battery cells may be connected in parallel, in series, or in a series-and-parallel configuration to deliver a target voltage, capacity, or power density. The CAN bus 120 may be configured according to a bus standard that enables microcontrollers and devices to communicate with each other and that is able to support the voltage, current, and power useful for the operation of such systems.

The secondary nodes 110 may also include a battery management unit 141. The battery management unit 141 may be any electronic system or circuitry that manages the operation and charging of rechargeable battery units 119, and protects such battery units 119 from operating outside target operating parameters. For instance, the battery management unit 141 may include an embedded controller system that manages and controls battery unit voltage, current, and temperature levels for safe and proper operation. The battery management unit 141 may monitor the state of the battery unit, calculate battery output related data, and provide such data to the primary node 105.

The secondary nodes 110, including the battery packs, may communicate battery module information, such as temperature and voltage information, with the primary node 105 according to the WBMS networking protocol. The primary node 105 and the secondary nodes 110 may also be configured to communicate according to any suitable wireless communication protocol(s), such as BLUETOOTH, Wi-Fi, wireless access network (WAN), near field communication (NFC), or other wireless communications technology.

To establish the network between the primary node 105 and the secondary nodes 110 and begin exchanging data, the network formation process may include a scanning phase followed by a data exchange phase. As described below, depending on the network formation type implemented based on the current network condition, the network formation process may also include a pairing phase between the scanning phase and the data exchange phase. During the scanning phase, the primary node 105 scans the network to detect the existing secondary nodes 110 to join the network. During the pairing phase, the primary node 105 exchanges network settings, such as network keys for securing communications, with the secondary nodes 110 before starting to exchange data in the data exchange phase.

Figure 2:
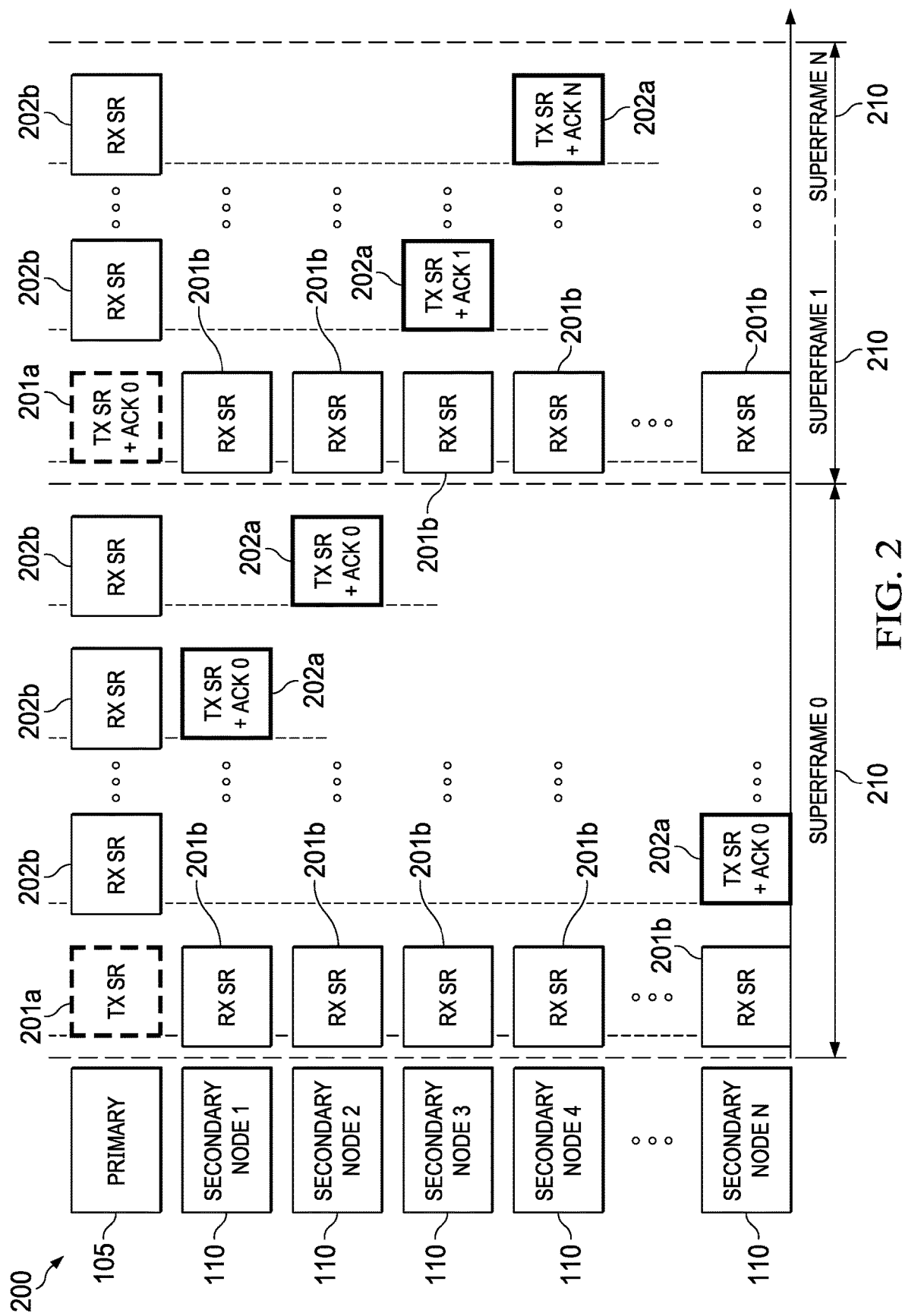
FIG. 2 is a diagram of a scanning phase of a network formation process, in accordance with various examples.

FIG. 2 is a diagram of a scanning phase 200 of a network formation process, in accordance with various examples. The scanning phase 200 may be initiated by the primary node 105, such as the ECU, to detect the secondary nodes 110, such as the battery modules, in a wireless network system, such as the WBMS. The scanning phase process may be repeated over one or more superframes 210, until the existing and new secondary node 110 are detected by responding to a primary scan request (PSR) from the primary node 105. An existing secondary node 110 may be a secondary node 110 which has previously established a connection with the primary node 105 and accordingly is recognized by the primary node 105. A new secondary node 110 may be a new node that is added to the wireless network system. Each superframe 210 may be an allocated time period in which the primary node 105 sends the PSR on a downlink time slot to the secondary nodes 110 and receives a secondary scan response (SSR) from each existing secondary node 110 and any new secondary node 110 on a respective uplink time slot responsive to the PSR. The PSR and SSRs may be sent in respective packets by the primary node 105 and secondary nodes 110. Each superframe 210 may be partitioned into a downlink time slot for the primary node 105 and an uplink time slot for each secondary node 110. The primary node 105 and the secondary nodes 110 may be programmed to transmit and receive the PSR and SSRs according to a programmed procedure. For example, allocating the downlink and uplink time slots may be programmed at the primary node 105 and the secondary nodes 110 according to the saved network configuration information from the last time the network was established by the primary node 105 with secondary nodes 110. The network configuration information may be stored by the primary node 105 and the secondary nodes 110 in nonvolatile memory. This allows the network configuration information to be kept even if the primary node 105 and secondary nodes 110 were powered down.

As shown in FIG. 2, in a first superframe 210, the primary node 105 may transmit the PSR in a downlink transmission time slot 201a. The PSR may be broadcast in the network for a number N secondary nodes 110 to be received in downlink reception time slots 201b by the secondary nodes 110, where N is a positive integer that is greater or equal to one. The N secondary nodes 110 may include existing and any new secondary nodes 110. According to the network configuration, the downlink transmission time slot 201a of the primary node 105 may overlap with the downlink reception time slots 201b of all the secondary nodes 110. This allows the N secondary nodes 110 to receive the PSR from the primary node 105 in overlapping time slots. The secondary nodes 110 that receive the PSR from the primary node 105 in the first superframe 210 may respond by sending a SSR with acknowledgment (ACK) in respective uplink transmission time slots 202a to the primary node 105. The acknowledgement may indicate the superframe 210 in which the secondary nodes 110 have responded. For example, the acknowledgement may include a first sequence number (e.g., ACK0) associated with the first superframe 210 (e.g., superframe0). The uplink transmission time slots 202a for the respective secondary nodes 110 may not overlap in time. This allows the primary node 105 to receive the SSRs from the different secondary nodes 110 in nonoverlapping respective uplink reception time slots 202b, and accordingly avoid interference between the packets from the secondary nodes 110. The uplink transmission time slot 202a of each secondary node 110 may overlap with one respective uplink reception time slot 202b of the primary node 105.

After receiving the SSRs from the secondary nodes 110, the primary node 105 may determine whether there are any more secondary nodes 110 in the network that have not responded to the PSR from the primary node 105 in the first superframe 210. For example, the primary node 105 may compare the unique IDs of the secondary nodes 110, which are received in the respective SSRs of the secondary nodes 110, to previously saved unique IDs at the primary node 105. The unique IDs may be saved as part of the network configuration information from the last time the network was established. If the primary node 105 determines that one or more secondary nodes 110 in the network have not responded to the PSR, the scanning phase process is repeated in one or more superframes 210 until each detected secondary node 110 in the network is accounted for. For example, the scanning phase process may be repeated for N superframes 210 to account for the N secondary nodes 110. At each next superframe 210 after the first superframe 210 (e.g., superframe0), the primary node 105 may include with the PSR in the downlink transmission time slot 201a the acknowledgement received from the secondary nodes 110 in the preceding superframe 210. Accordingly, the secondary nodes 110 that have already responded to a PSR in a preceding superframe 210 may not respond to the new PSR in the new superframe 210. For each superframe 210, the primary node 105 and the responding secondary nodes 110 may transmit and receive the PSR and SSRs at a different frequency, such as according to the network configuration information. Changing the frequency for exchanging the primary and SSRs in the downlink and uplink time slots for each superframe 210 is referred to herein as channel hopping. Responsive to the primary node 105 determining that all secondary nodes 110 in the network have been accounted for, the scanning phase 200 ends. For example, the primary node 105 may set a switch field in a PSR in a downlink packet transmitted to the secondary nodes 110 to indicate that the scanning phase 200 may be switched to a next phase of the network formation process. The switch field may indicate switching to a next pairing phase or switching to a data exchange phase and skipping the pairing phase.

Figure 3:
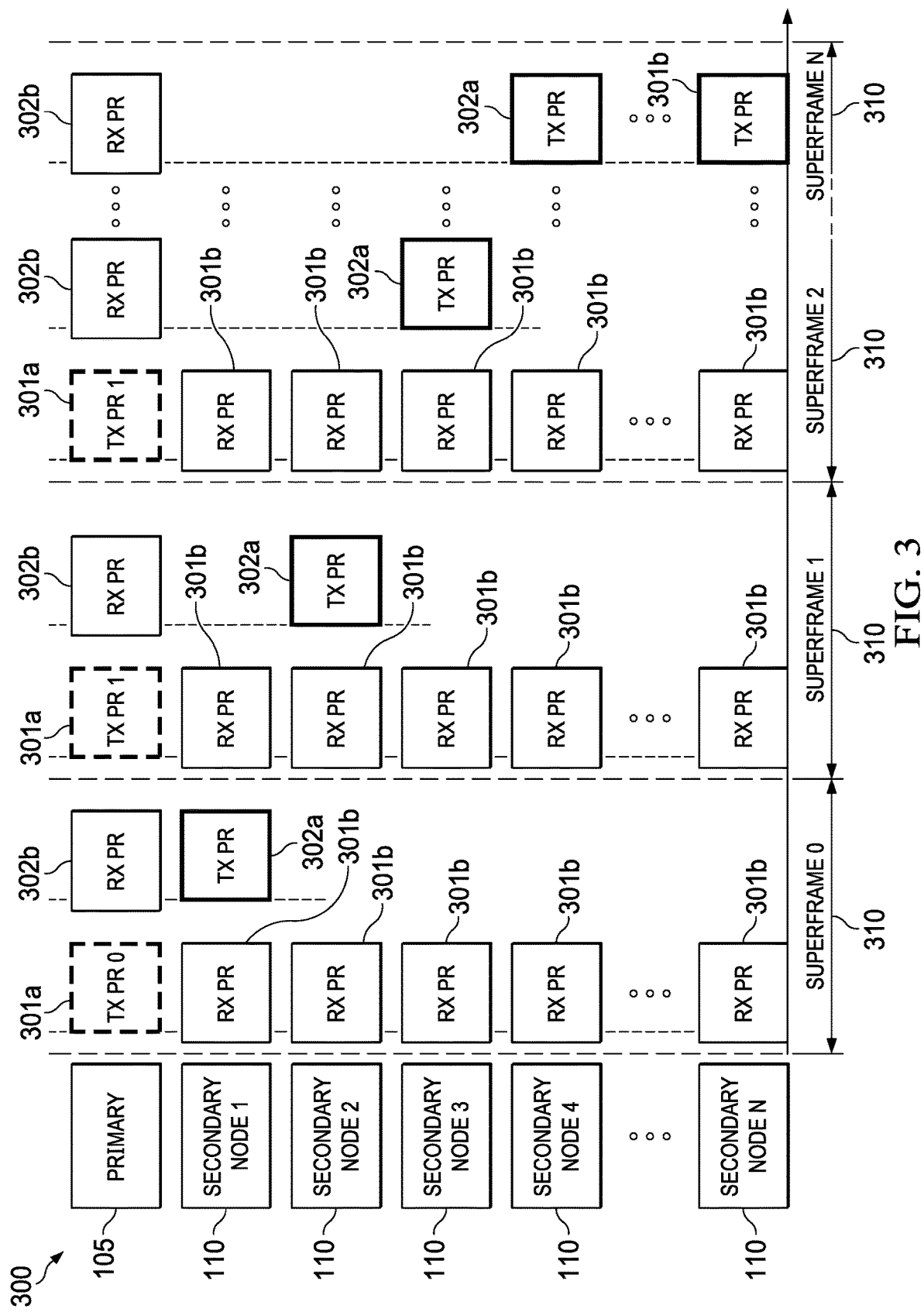
FIG. 3 is a diagram of a pairing phase of a network formation process, in accordance with various examples.

FIG. 3 is a diagram of a pairing phase 300 of a network formation process, in accordance with various examples. The pairing phase 300 may be a next phase of the network formation process after the scanning phase 200. The pairing phase 300 may be initiated by the primary node 105 to pair, according to a respective unique ID, with each secondary node 110 that was scanned and accounted for during the scanning phase 200. During the pairing, the secondary node 110 may receive network information including current network configuration information from the primary node 105. The secondary node 110 may store the current network configuration in a nonvolatile memory, which may be useful in subsequent network communication and future network formation sessions. The primary node 105 may also save a list of the paired secondary nodes 110, according to the respective unique IDs, in a nonvolatile memory.

The pairing phase process may be repeated over one or more superframes 310 until all the scanned secondary nodes 110 are paired by responding to a primary pair request (PPR) from the primary node 105. Each superframe 310 may be an allocated time period in which the primary node 105 sends the PPR on a downlink time slot to the secondary nodes 110 and receives a secondary pair response (SPR) from one of the scanned secondary nodes 110 on a respective uplink time slot. Accordingly, the pairing phase process may be repeated over N superframes 310 to account for N secondary nodes 110, where each superframe 310 is useful to receive one SPR from one secondary node 110. The PPR and SPRs may be sent in respective packets from the primary node 105 and secondary nodes 110. Each superframe 210 may be partitioned into a downlink time slot for the primary node 105 and an uplink time slot for one secondary node 110. The primary node 105 and the secondary nodes 110 may be programmed to transmit and receive the PPR and SPRs according to a programmed procedure, such as based on the saved network configuration information.

As shown in FIG. 3, in a first superframe 310 the primary node 105 may transmit the PPR in a downlink transmission time slot 301a. The PPR may be broadcast in the network for N scanned secondary nodes 110 to be received in a downlink reception time slot 301b by the scanned secondary nodes 110. According to the network configuration, the downlink transmission time slot 301a of the primary node 105 may overlap with the downlink reception time slots 301b of the scanned N secondary nodes 110. This allows the N secondary nodes 110 to receive the PPR from the primary node 105 in overlapping time slots. In each superframe 210, one of the secondary nodes 110 that receives the PPR from the primary node 105 may respond by sending a SPR in a respective uplink transmission time slot 302a to the primary node 105. For example, a first secondary node 110 (secondary node 1) may send a SPR in the first superframe 210 (superframe0). Sending the SPRs from the secondary nodes 110 in respective uplink transmission time slots 202a in different superframes 310 allows the primary node 105 to receive the SPRs without interference between the respective packets from the secondary nodes 110. The uplink transmission time slot 302a of each secondary node 110 may overlap with one respective uplink reception time slot 302b of the primary node 105. After receiving N SPRs from N scanned secondary nodes 110, the pairing phase 300 ends. For example, the primary node 105 may set a switch field in a PPR in a downlink packet transmitted to the secondary nodes 110 to indicate that the pairing phase 300 may be switched to a next phase of the network formation process.

Figure 4:
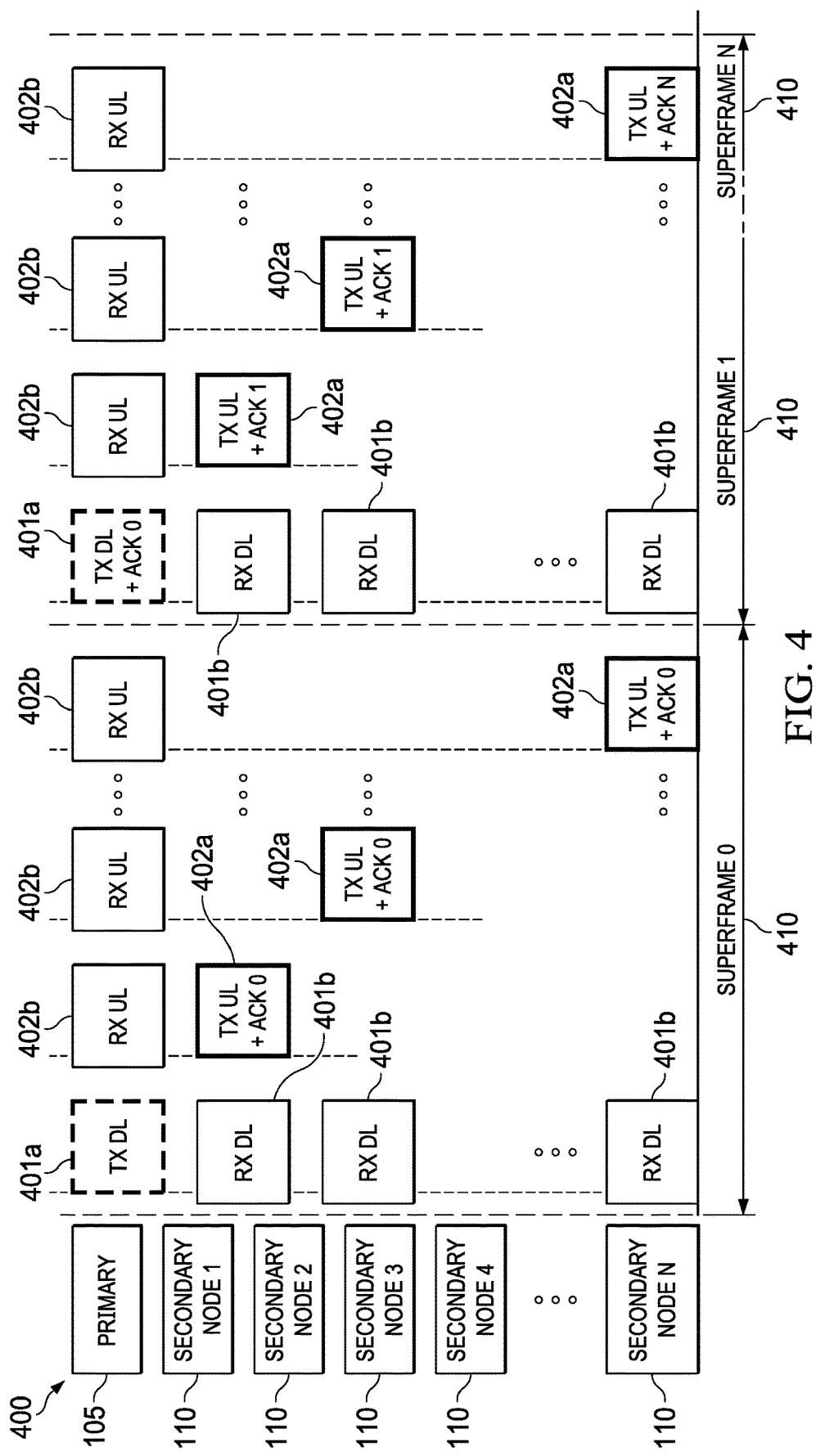
FIG. 4 is a diagram of a data exchange phase of a network formation process, in accordance with various examples.

FIG. 4 is a diagram of a data exchange phase 400 of a network formation process, in accordance with various examples. The data exchange phase 400 may be a next phase of the network formation process after the scanning phase 200 or the pairing phase 300, depending on the network formation type implemented to reduce network formation time. The data exchange phase 400 may be initiated by the primary node 105 to start the data exchange in the network with the scanned secondary nodes 110. The data exchange phase process may be repeated over one or more superframes 410. Each superframe 410 may be an allocated time period in which the primary node 105 sends downlink data (DL) on a downlink time slot to the secondary nodes 110 and receives uplink data (UL) from each secondary node 110 on a respective uplink time slot. The downlink data and uplink data may be sent in respective packets from the primary node 105 and secondary nodes 110. Each superframe 410 may be partitioned into a downlink time slot for the primary node 105 and an uplink time slot for each secondary node 110. The primary node 105 and the secondary nodes 110 may be programmed to transmit and receive the downlink data and the uplink data according to a programmed procedure, such as based on the saved network configuration information.

The primary node 105 and the secondary nodes 110 may update the saved network configuration from the last connected network with new network configuration information exchanged during the phases of a new network connection. The updated network configuration information may be saved in the nonvolatile memories of the primary node 105 and secondary nodes 110. The primary node 105 and secondary nodes 110 may also update and save the unique IDs of the new network connection. For example, the primary node 105 may detect new secondary nodes 110 that are added to the network during the scanning phase 200 and save the new unique IDs of the new secondary nodes 110. The new secondary nodes 110 may also save network settings obtained during the pairing phase 300.

As shown in FIG. 4, in a first superframe 410, the primary node 105 may transmit the downlink data in a downlink transmission time slot 401a. The downlink data may be broadcast in the network for N secondary nodes 110 to be received in downlink reception time slot 401b by the secondary nodes 110. According to the network configuration, the downlink transmission time slot 401a of the primary node 105 may overlap with the downlink reception time slots 401b of all the secondary nodes 110. This allows the N secondary nodes 110 to receive the downlink data from the primary node 105 in overlapping time slots. The secondary nodes 110 may respond by sending uplink data with ACK in respective uplink transmission time slots 402a to the primary node 105. The ACK may indicate the superframe 210 in which the secondary nodes 110 have responded. For example, the acknowledgement may include a first sequence number (e.g., ACK0) associated with the first superframe 210 (superframe0), a second sequence number (ACK1) associated with the second superframe 210 (superframe1), and so forth. The uplink transmission time slots 402a for the respective secondary nodes 110 may not overlap in time. This allows the primary node 105 to receive the uplink data from the different secondary nodes 110 in nonoverlapping respective uplink reception time slots 402b, and accordingly avoid interference between the packets from the secondary nodes 110. The uplink transmission time slot 402a of each secondary node 110 may overlap with one respective uplink reception time slot 402b of the primary node 105.

Figure 5:
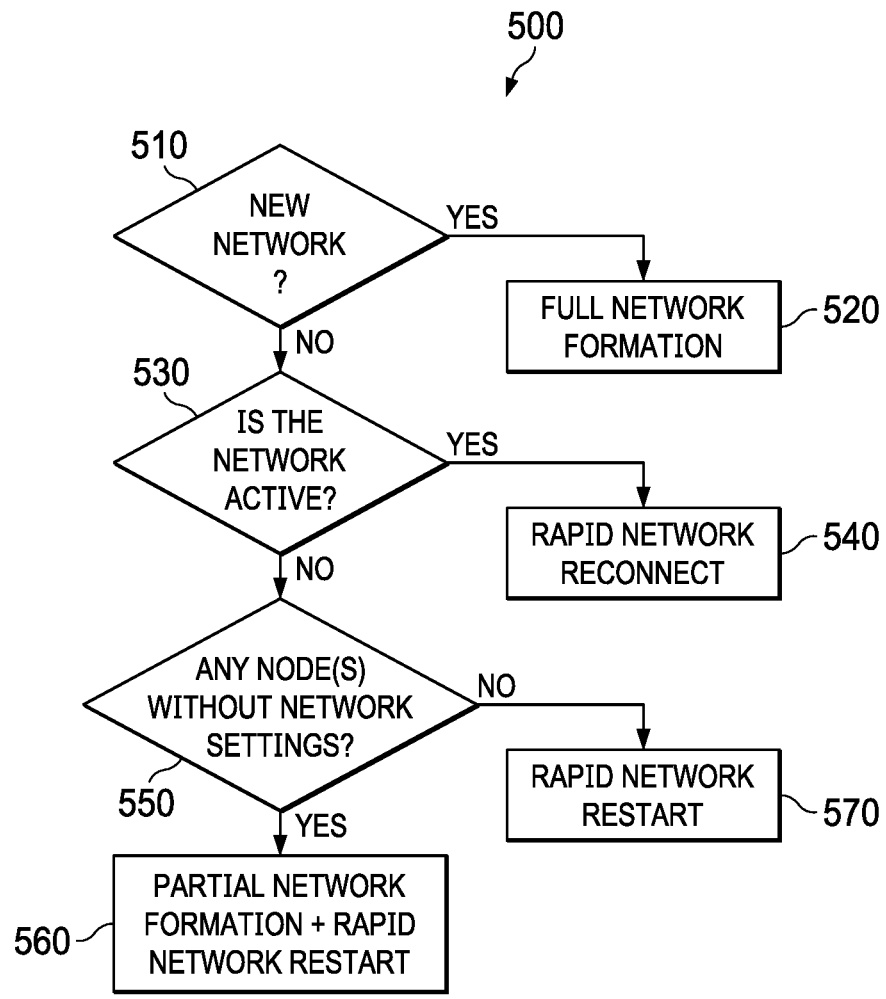
FIG. 5 is a flow diagram of determining network formation types according to network conditions, in accordance with various examples.

FIG. 5 is a flow diagram 500 of determining network formation types according to network conditions, in accordance with various examples. The flow diagram 500 shows a decision process of the primary node 105 for implementing a network formation process from multiple network formation types depending on a current network condition from multiple possible network conditions. The network conditions include a first network condition 510 based on whether the network is a new network or a previously established network. The primary node 105 may determine that the network is a new network if the primary node 105 does not have information about any secondary node 110 or that a secondary node 110 has been previously connected to the primary node 105. For example, the network in the WBMS may be a new network if the battery modules in the automotive vehicle 100 are installed and connected for a first time to the ECU. The network may also be a new network in the event that the network is reset such as a after a firmware upgrade. In the case of a new network, the primary node 105 may implement a first network formation process 520 which may be a full network formation process including both scanning and pairing phases to establish the network with the secondary nodes 110. Accordingly, the primary node 105 initiates the scanning phase 200 over one or more superframes 210 until the secondary nodes 110 that are connected to the network have responded. After the scanning phase 200, the primary node 105 may initiate the pairing phase 300 to pair with each of the secondary nodes 110 to exchange network setting for establishing a secured network connection. After the pairing phase 300, the primary node 105 and the secondary nodes 110 may start the data exchange phase 400 to exchange data.

In the first network condition 510, if the primary node 105 determines that the network is a previously established network then the primary node 105 may implement another network formation process depending on a second network condition 530 that is based on whether the network is an active or inactive network. The primary node 105 may determine that the network is an active network if the primary node 105 and existing secondary nodes 110 have entered a sleep mode without a connection error and have not been powered off. The primary node 105 and the secondary nodes 110 may also retain their network configuration if the network is an active network. In the case of an active network, the primary node 105 may implement a second network formation process 540 which may be a rapid network reconnect process to establish the network with the secondary nodes 110. Accordingly, the primary node 105 may initiate the scanning phase 200 over one or more superframes 210 until the secondary nodes 110 that are connected to the network have responded. After the scanning phase 200, the primary node 105 may skip the pairing phase 300 and start the data exchange phase 400 to exchange data with the secondary nodes 110. The pairing phase 300 may be skipped by setting a switch field in a primary SR in a downlink packet transmitted to the secondary nodes 110 to indicate that the pairing phase 300 may be skipped and indicate a switching from the scanning phase 200 to the data exchange phase 400.

For example, the network may be an active network if the automotive vehicle 100 is shut off and the network in the WBMS enters a power save mode, also referred to herein as a low power mode. During this mode, the secondary nodes 110 may perform periodic channel sniffing to detect a wake up signal transmitted on a channel from the primary node 105 to reestablish the network. During channel sniffing, a secondary node 110 may end the low power mode if the wake up signal is detected and sense a received signal strength indicator (RSSI) on the respective channel. The secondary node 110 may then enter a reception mode if the RSSI is above a certain threshold. If the RSSI is below the threshold, the secondary node 110 may reenter the low power mode. The secondary nodes 110 may either continue the periodic channel sniffing process on the last channel of the primary node 105 or may switch to another channel according to a network configuration. Responsive to the primary node 105 determining to reconnect the network, the primary node 105 may send out a certain wave form with a certain preamble to wake up the secondary nodes 110. The secondary nodes 110 may be capable of sensing the channel of the wake signal based on the length of the preamble and the amount of time needed to sense the channel, which may depend on physical modulation settings of the network. The pulse of the wake up signal and the frequency of the channel for detecting the wake up signal may be configured to allow the secondary nodes 110 to receive the wake up signal and reconnect with the network in a certain amount of time while providing power saving in the network.

In the second network condition 530, if the primary node 105 determines that the network is not active then the primary node 105 may implement another network formation process depending on a third network condition 550 that is based on whether any of the secondary nodes 110 are without network settings. The primary node 105 may determine that any of the secondary nodes 110 are new nodes that are added to the network and accordingly have not yet obtained the network settings, such as by a network formation process with the primary node 105. In the case of new secondary nodes 110 that are without network settings, the primary node 105 may implement a third network formation process 560 which may be a partial network formation process with a rapid network restart process. Accordingly, the primary node 105 may initiate the scanning phase 200 over one or more superframes 210 until the secondary nodes 110 that are connected to the network have responded. After the scanning phase 200, the primary node 105 may initiate the pairing phase 300 to pair with the new secondary nodes 110 that have not obtained the network settings and may skip the previously connected secondary nodes 110 that have previously established a connection with the primary node 105 and obtained the network settings. For example, the previously connected secondary nodes 110 may have saved network configuration information including unique IDs and network settings previously exchanged with the primary node 105. After the pairing phase 300, the primary node 105 and the secondary nodes 110 may start the data exchange phase 400 to exchange data.

For example, the partial network formation process may be performed responsive to the network being reset and one or more secondary nodes 110 being added to the network in the WBMS. The network configuration of the last established network may be saved in nonvolatile memory of the primary node 105 and the previously connected secondary nodes 110. With this information, the primary node 105 can perform a rapid network restart process to reconnect any secondary nodes 110 that were connected on the previously established network. The rapid network restart process may include implementing the scanning phase 200 with the previously connected secondary nodes 110 and skipping the pairing phase 300. After reconnecting the previously connected secondary nodes 110, the primary node 105 can search, during the pairing phase 300, for any new secondary nodes 110 in the network to pair with the new secondary node 110. This partial network formation process may decrease the startup latency, in comparison to the full network formation process, by only targeting the new secondary nodes 110 and allowing the previously connected secondary nodes 110 to implement the rapid network restart process where pairing is skipped. The startup time of the partial network formation process may be related to the number of new secondary nodes 110 in the network. Accordingly, the startup time may be shorter if the number of previously connected secondary nodes 110 that perform the rapid network restart process is greater.

In the third network condition 550, if the primary node 105 determines that there are no secondary nodes 110 without network settings and all the secondary nodes 110 are previously connected nodes then the primary node 105 may implement a fourth network formation process 570. The fourth network formation process 570 may be a rapid network restart process similar to the rapid network restart process of the third network formation process 560. Accordingly, the primary node 105 may initiate the scanning phase 200 over one or more superframes 210 until the previously connected secondary nodes 110 have responded. After the scanning phase 200, the primary node 105 may skip the pairing phase 300 and start the data exchange phase 400 to exchange data with the secondary nodes 110. For example, the primary node 105 may perform the rapid network restart process responsive to all the secondary nodes 110 in the network being previously connected nodes and the primary node 105 or both the primary node and the secondary nodes 110 enter a powered off state. The primary node 105 and the secondary nodes 110 may retain their network configuration during the powered off state. The primary node 105 and the secondary nodes 110 may end the powered off state to reconnect the network. During the scanning phase 200, each secondary node 110 may confirm the network configuration and notify the primary node 105 of its presence.

Figure 6:
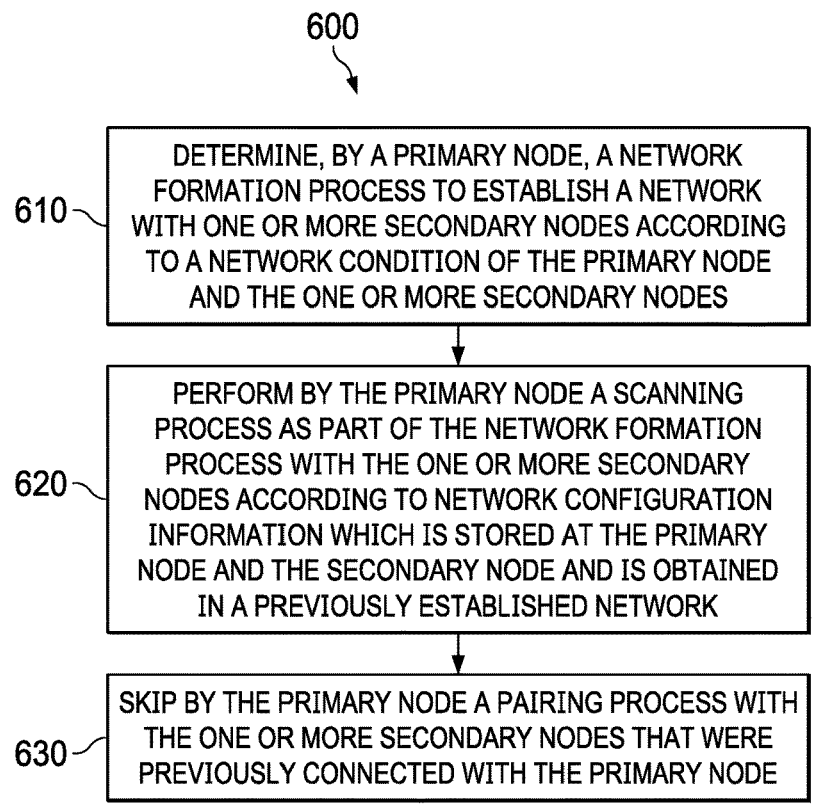
FIG. 6 is a flow diagram of a method for a network formation process between a primary node and a secondary node in a wireless network, in accordance with various examples.

FIG. 6 is a flow diagram of a method 600 for a network formation process between a primary node and a secondary node in a wireless network, in accordance with various examples. For example, the method 600 may be implemented by the primary node 105 to establish a network with one or more secondary nodes 110. At step 610, a network formation process may be determined by the primary node 105 to establish a network with the one or more secondary nodes 110 according to a network condition of the primary node 105 and the one or more secondary nodes 110. For example, the primary node 105 may determine whether to perform a full network formation process, a rapid network reconnect process, a partial network formation process or a rapid network restart process depending on whether the network is active and includes any new secondary nodes 110 that were not previously connected with the primary node 105. At step 620, the primary node 105 may perform a scanning process as part of the network formation process with the one or more secondary nodes 110 according to network configuration information which is stored at the primary node and the secondary node and is obtained in a previously established network connection. At step 630, the primary node 105 may skip a pairing process with the one or more secondary nodes 110 that were previously connected with the primary node 105. For example, the primary node 105 may determine that the network is an active network with previously connected secondary nodes 110 and accordingly perform a rapid network reconnect process including scanning the secondary nodes 110 without pairing. In another example, the primary node 105 may determine one or more secondary nodes 110 have not been previously connected to the primary node 105 as part of a previously established network connection and do not include network settings. Accordingly, the primary node may perform a partial network formation process including scanning and pairing of the new secondary nodes 110, and perform a rapid network restart process of the previously connected secondary nodes 110 without pairing.

Although the examples of the various methods and processes are described above in the context of a WBMS, the examples provided in the description may be extended to any wireless network system. For example, the steps and systems in the examples can be extended to other wireless communication standards and technologies, such as BLUETOOTH, WI-FI, wireless local area network (WLAN), low-power wireless personal area network (WPAN), and other suitable wireless communications technologies. The wireless network systems described herein may also find application beyond automotive vehicles. Other applications which the wireless network systems described herein may be useful include wireless networking (e.g., cell phone networks, WLANs, wireless sensor networks, satellite communication networks, terrestrial microwave networks), personal electronics (e.g., smartphones, laptop computers, desktop computers, tablets, notebooks, artificial intelligence assistants), appliances (e.g., refrigerators, microwave ovens, toaster ovens, dishwashers), avionics (e.g., aircraft, satellites, spacecraft), and numerous other electronic systems that involve wireless communications.

Figure 7:
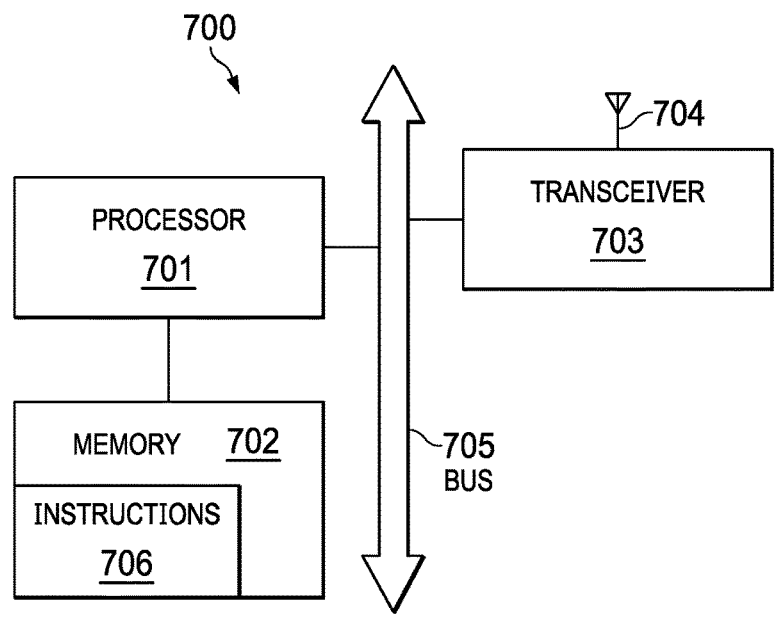
FIG. 7 is a block diagram of a hardware architecture of a network device, in accordance with various examples.

FIG. 7 is a block diagram of a hardware architecture 700 of a network device, in accordance with various examples. The hardware architecture 700 include hardware components that may be part of a primary node or a secondary node in a wireless network system. For example, the hardware architecture 700 may correspond to a hardware system in the primary node 105 or the secondary nodes 110 of a WBMS. As shown in FIG. 7, the hardware architecture 700 may include one or more processors 701 and one or more memories 702. In some examples, the hardware architecture 700 may also include one or more transceivers 703 and one or more antennas 704 for establishing wireless connections. These components may be coupled through a bus 705, or in any other suitable manner. In FIG. 7, an example in which the components are coupled through a bus 705 is shown.

The processor 701 may be configured to read and execute computer-readable instructions. For example, the processor 701 may be configured to invoke and execute instructions stored in the memory 702, including the instructions 706. The processor 701 may support one or more global systems for wireless communication. Responsive to the processor 701 transmitting a message or data, the processor 701 drives or controls the transceiver 703 to perform the transmitting. The processor 701 also drives or controls the transceiver 703 to perform receiving, responsive to the processor 701 receiving a message or data. Therefore, the processor 701 may be considered as a control center for performing transmitting or receiving and the transceiver 703 is an executor for performing the transmitting and receiving operations.

In some examples, the memory 702 may be coupled to the processor 701 through the bus 705 or an input/output port (not shown). In other examples, the memory 702 may be integrated with the processor 701. The memory 702 is a non-transitory computer-readable medium configured to store various software programs and/or multiple groups of instructions, including instructions 706. For example, the memory 702 may include a high-speed random-access memory and/or may include a nonvolatile memory such as one or more disk storage devices, a flash memory or another nonvolatile solid-state storage device. The memory 702 may store an operating system such as ANDROID, IOS, WINDOWS, or LINUX. The memory 702 may further store a network communication program. The network communication program is useful for communication with one or more attached devices, one or more user equipments, or one or more network devices, for example. The memory 702 may further store a user interface program. The user interface program may display content of an application through a graphical interface and receive a control operation performed by a user on the application via an input control such as a menu, a dialog box, or a physical input device (not shown). The memory 702 may be configured to store the instructions 706 for implementing the various methods and processes provided in accordance with the various examples of this description.

The antenna 704 may be configured to enable the exchanging of wireless communication signals between the processing system and a network or another system or device. The antenna 704 may be configured to convert electromagnetic energy into an electromagnetic wave in free space or convert an electromagnetic wave in free space into electromagnetic energy in a transmission line. The transceiver 703 may be configured to transmit a signal that is provided by the processor 701 or may be configured to receive a wireless communication signal received by the antenna 704. In this example, the transceiver 703 may be considered a wireless transceiver.

The hardware architecture 700 may also include another communication component such as a Global Positioning System (GPS) module, cellular module, a BLUETOOTH or BLE module, Zigbee module, or a WI-FI module. The hardware architecture 700 may also support another wireless communication signal such as a satellite signal or a shortwave signal. The hardware architecture 700 may also be provided with a wired network interface or a local area network (LAN) interface to support wired communication.

In various examples, the hardware architecture 700 may further include an input/output device (not shown) such as an audio input/output device, a key input device, a display and the like. The input/output device may be configured to implement interaction between the hardware architecture 700 and a user/an external environment and may include the audio input/output device, the key input device, the display, and the like. The input/output device may further include a camera, a touchscreen, a sensor, and the like. The input/output device may communicate with the processor 701 through a user interface.

The hardware architecture 700 shown in FIG. 7 is an example of implementation in various examples of this description. During actual application, the hardware architecture 700 may include more or fewer components.

The term "couple" appears throughout the specification. The term may cover connections, communications or signal paths that enable a functional relationship consistent with this description. For example, if device A provides a signal to control device B to perform an action, in a first example device A is coupled to device B or in a second example device A is coupled to device B through intervening component C if intervening component C does not substantially alter the functional relationship between device A and device B such that device B is controlled by device A via the control signal provided by device A.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device or a combination thereof.

An architecture or device that is described herein as including certain components may instead be adapted to be coupled to those components to form the described architecture or device.

Unless otherwise stated, "about," "approximately," or "substantially" preceding a value means +/−10 percent of the stated value. Modifications are possible in the described examples, and other examples are possible within the scope of the claims.

What is claimed is:

1. A method, comprising:
   determining, by a primary node, a network formation process to establish a network with a secondary node according to a network condition of the primary node and the secondary node, wherein the secondary node was previously paired to the primary node in a previously established network connection between the primary node and the secondary node, wherein the network formation process is a rapid network reconnect responsive to the network being an active network, wherein the active network is a network in which primary node and the secondary node are previously paired and have entered a sleep mode without a connection error and have not been powered off, thereby retaining their network configuration;
   performing, by the primary node, a scanning phase as part of the network formation process with the secondary node according to network configuration information stored by the primary node and the secondary node, the network configuration information obtained by the primary node and the secondary node in the previously established network connection; and
   skipping, by the primary node, a pairing phase of the network formation process with the secondary node responsive to the secondary node being previously paired to the primary node in the previously established network connection.

2. The method of claim 1, further comprising beginning, by the primary node, a data exchange phase of the network formation process with the secondary node after the scanning phase is completed.

3. The method of claim 1, wherein the network is the active network responsive to the primary node and the secondary node being in a sleep mode or low power mode prior to performing the scanning phase.

4. The method of claim 1, wherein the network formation process is a rapid network restart process, and wherein the primary node and the secondary node are in a powered off state prior to performing the scanning phase.

5. The method of claim 1, wherein the secondary node is a first secondary node, wherein the network includes a second secondary node that was not previously paired to the primary node, and wherein the network formation process includes a rapid network restart process for the first secondary node and a partial network formation process for the second secondary node.

6. The method of claim 5, the partial network formation process comprising:
   detecting, by the primary node, the second secondary node during the scanning phase; and
   performing, by the primary node, the pairing phase with the second secondary node to exchange the network configuration information and network settings for establishing a secured network connection with the second secondary node.

7. The method of claim 6, wherein the rapid network restart process includes the scanning phase during which the first secondary node communicates with the primary node without the pairing phase.

8. The method of claim 6, wherein the second secondary node is detected based on detecting a new unique identifier (ID) received by the primary node in an uplink time slot from the second secondary node, the new unique ID not having been previously stored by the primary node.

9. The method of claim 1, wherein the network configuration information is stored in nonvolatile memories at the primary node and the secondary node.

10. A method, comprising:
    initiating, by a primary node, a scanning phase of a network formation process to establish a network with secondary nodes according to network configuration information, the network configuration information stored in nonvolatile memories by the primary node and the secondary nodes, and the network configuration information obtained by the primary node and the secondary nodes is of a previously established network connection between the primary node and the secondary nodes, wherein the network formation process is a rapid network reconnect responsive to the network being an active network, wherein the active network is a network in which primary node and the secondary node are previously paired and have entered a sleep mode without a connection error and have not been powered off, thereby retaining their network configuration;
    skipping, by the primary node, a pairing phase of the network formation process with the secondary nodes responsive to the primary node and the secondary nodes having the previously established network connection; and
    initiating, by the primary node and without performing the pairing phase for the secondary nodes, a data exchange phase of the network formation process with the secondary nodes.

11. The method of claim 10, further comprising:
    transmitting, by the primary node, scan requests to the secondary nodes in downlink time slots; and
    receiving, by the primary node, scan responses from the secondary nodes in uplink time slots, the downlink time slots and the uplink time slots allocated according to a procedure and based on the network configuration information stored by the primary node and secondary nodes.

12. The method of claim 10, further comprising:
    detecting, by the primary node during the scanning phase, a second secondary node that is without network settings; and
    initiating, by the primary node, the pairing phase with the second secondary node to provide the second secondary node with the network settings, wherein the second secondary node has not previously been paired to the primary node, and wherein the network settings are for establishing a secured network connection.

13. The method of claim 12, further comprising detecting, by the primary node during the scanning phase, the secondary nodes according to unique identifiers (IDs) stored in the nonvolatile memories at the primary node and the secondary nodes, wherein the unique IDs are not for the second secondary node.

14. The method of claim 10, further comprising:

setting, by the primary node, a switch field in a scanning request in a downlink packet to indicate the skipping of the pairing phase and switching to the data exchange phase; and transmitting, by the primary node, the downlink packet during the scanning phase to the secondary nodes.

15. An apparatus, comprising:

secondary nodes comprising first non-transitory and non-volatile memories configured to save network configuration information; and a primary node comprising a second non-transitory and nonvolatile memory configured to save the network configuration information, the primary node configured to:

perform a scanning phase as part of a network formation process with the secondary nodes to establish a network according to the network configuration information, the network configuration information obtained by the primary node and the secondary nodes in a previously established network connection between the primary node and the secondary nodes, wherein the network formation process is a rapid network reconnect responsive to the network being an active network, wherein the active network is a network in which primary node and the secondary node are previously paired and have entered a sleep mode without a connection error and have not been powered off, thereby retaining their network configuration; and skip a pairing phase of the network formation process with the secondary nodes responsive to the primary node and the secondary nodes having the previously established network connection.

16. The apparatus of claim 15, wherein the primary node is configured to:

set a switch field in a scanning request to indicate skipping the pairing phase;

transmit the scanning request in a downlink packet during the scanning phase with the secondary nodes; and begin, after completing the scanning phase, a data exchange phase of the network formation process with the secondary nodes.

17. The apparatus of claim 15, further comprising a second secondary node that was not previously connected to the primary node, wherein the primary node is configured to:

detect, during the scanning phase, the second secondary node according to a scan response received on an uplink time slot from the second secondary node to the primary node; and perform the pairing phase of the network formation process with the second secondary node and without the secondary nodes to provide the second secondary node with network settings for establishing a secured network connection.

18. The apparatus of claim 17, wherein the primary node, the secondary nodes, and the second secondary node are configured to save unique identifiers (IDs) assigned to the secondary nodes and the second secondary node during the network formation process.

19. The apparatus of claim 17, wherein the second secondary node comprises a third non-transitory and nonvolatile memory configured to save the network settings for establishing the secured network connections, the network settings exchanged between the primary node and the second secondary node during the network formation process.

20. The apparatus of claim 15, wherein the primary node and the secondary nodes are configured to update the saved network configuration information during the network formation process.

* * * * *